Jan. 24, 1967     L. L. MARRAFFINO     3,300,145
MIXING HEAD
Filed Feb. 4, 1965                       2 Sheets-Sheet 1
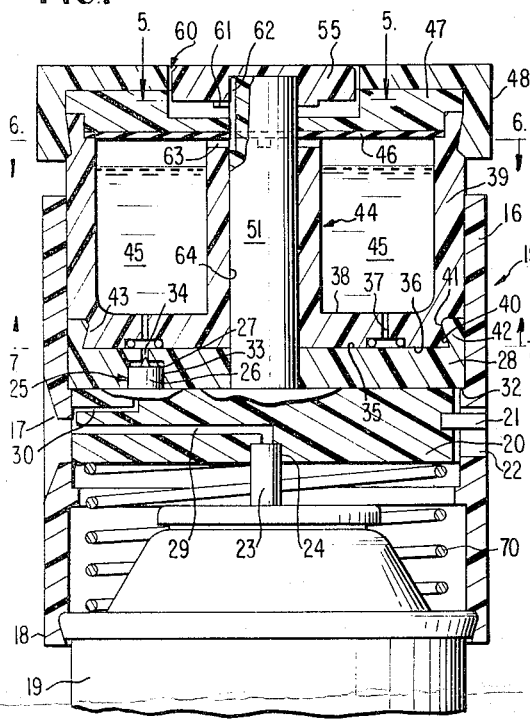
FIG. 1
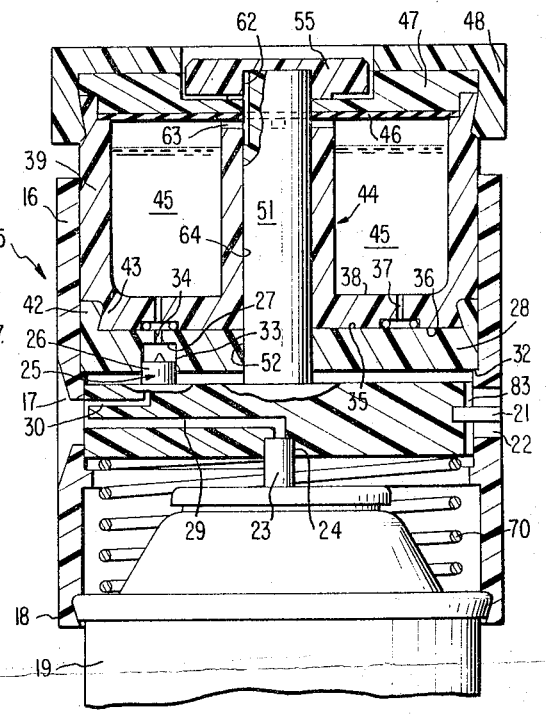
FIG. 2
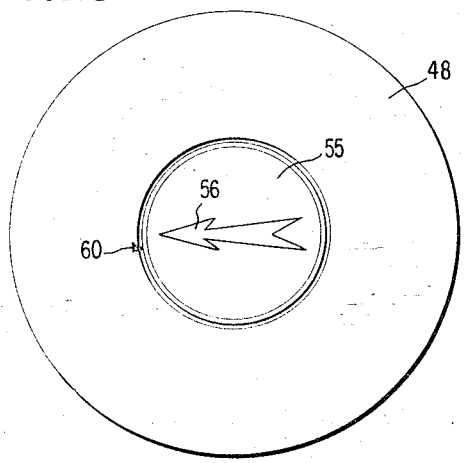
FIG. 3
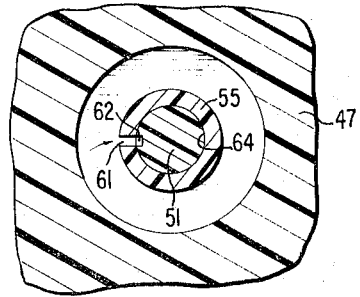
FIG. 4
FIG. 5
INVENTOR
LEONARD L. MARRAFFINO
BY Wynne & Finken
ATTORNEYS Jan. 24, 1967  L. L. MARRAFFINO  3,300,145

MIXING HEAD

Filed Feb. 4, 1965   2 Sheets-Sheet 2

INVENTOR
LEONARD L. MARRAFFINO

BY *Wynne & Fisken*
ATTORNEYS

United States Patent Office 3,300,145
Patented Jan. 24, 1967

3,300,145
MIXING HEAD
Leonard L. Marraffino, 1824 NW. 36th Court, Oakland Park, Fort Lauderdale, Fla. 33311
Filed Feb. 4, 1965, Ser. No. 430,295
5 Claims. (Cl. 239—307)

This invention relates to a spray head having a compartmented cup for selectively discharging an additive fluid into a stream of a propellant fluid discharging from a propellant container of the aerosol bomb type. More particularly, this invention relates to a spray head wherein the elements of the spray head are so constructed and arranged as to enable selective dispensing through a simple rotative operation of the compartmented cup followed by a downward actuation of a valve means which opens the valve of the aerosol bomb, the resultant propellant stream entraining and mixing with a gravity fed stream of released additive fluid. The minute duct systems required in spray heads of this type present difficult and expensive manufacturing problems. This invention minimizes these problems without sacrificing the required structural and fluid tight integrity of the system.

A housing is provided which is snapped onto a propellant container. A valve means is mounted in the lower portion of the housing for vertical movement only to actuate the container valve, the valve means including both additive and propellant fluid ducts. Immediately above the valve is mounted a seal disk, this disk being fixedly mounted within the housing and coacting with the valve means to allow additive fluid flow when the valve means is depressed and stopping such flow when the valve means is returned upwardly to sealing engagement therewith. Rotatably mounted above the seal disk is the compartmented cup and in the preferred modification the additive fluid is discharged from an opening in the bottom wall of the cup when the opening is aligned with the additive ducts of the seal disk and valve means. Alignment of the opening with the ducts is obtained through rotation of the cup. Vent means are provided for selectively venting a compartment when in discharge position.

My invention is directed to the dispensing of such materials as room deodorizers and the like. The room deodorizer in the can may be sprayed without an additive fluid by placing the cup in neutral position. Upon rotation of the cup, a scented fluid such as a pine oil may be moved into a discharge position and upon actuation of the aerosol bomb through downward movement of the valve means a small amount of the concentrated pine fluid will be combined with the fluid from the can. It will be recognized that there are many other products which may be similarly combined and dispensed.

These and further objects and advantages of the present invention will become more apparent upon reference to the following specification, appended claims and drawings wherein:

FIG. 1 is a vertical section showing the spray head in non-discharging position;

FIG. 2 is a view similar to FIG. 1 showing the spray head in discharging position;

FIG. 3 is a top view of the spray head;

FIG. 4 is a bottom perspective view of the button shown in FIG. 3;

FIG. 5 is a view taken on line 5—5 of FIG. 1;

Figure 6:
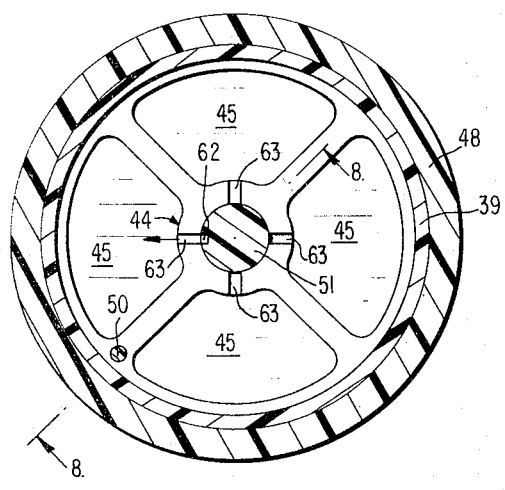
FIG. 6 is a view taken on line 6—6 of FIG. 1.

Referring now to the drawing, it will be seen that the spray head has a housing 15 with a vertical sidewall 16 having a spray aperture 17 in its lower portion and attaching means 18 at its lower edge for rigid engagement with the container 19. Valve means 20 in the form of a flat piston is mounted in the lower portion of the housing 15 at the spray aperture 17 and the valve means 20 is restricted to vertical movement only by means of a lug 21 which extends through a vertical slot 22 in the housing, this slot having a horizontal width about the size of the lug to prevent any rotational movement of the valve means and having a length sufficient to enable about a 3/32 of an inch vertical movement of the valve means downwardly to actuate the valve 23 of the container 19, this valve 23 being snugly received in the valve socket 24. Top seal means 25 is provided by an upstanding lock seal pin 26, this movable top seal means 25 coacting with the bottom seal means 27 of the seal disk 28 to control additive fluid flow. A propellant duct 29 extends from the socket 24 to the spray aperture 17 and a first additive duct 30 extends from the top seal means 25 (FIG. 9) to the spray aperture 17. These two ducts 29 and 30 terminate closely adjacent each other at the outer edge of the valve means 20 to enable entrainment and mixing of the additive and propellant fluids.

The seal disk 28 is mounted in a fixed position in the housing 15 so that its bottom seal means 27 is maintained in vertical alignment for sealing engagement with the top seal means 25 of the vertically movable valve means 20. In the preferred embodiment shown, this fixed position of the seal disk 28 is obtained through a supporting of the disk 28 on a horizontal internal annular ledge 32 of the housing 15 coupled with a pin socket 33 which sealably houses the seal pin 26 of the valve means 20 during all vertical movement thereof. A second additive duct 34 extends from the bottom seal means 27 to the top surface 35 of the seal disk, this top surface 35 coacting with the bottom surfaces 36 to provide a fluid seal when the openings 37 are in a non-discharge position. Preferably, the top surface 35 is an annular flat surface as shown to enable free rotation of the cup 39 through 360°.

The compartmented cup 39 is mounted in the housing for rotative movement only. No vertical movement of this cup 39 and its seal disk 28 is required for valve actuation. In the embodiment shown, this restricted movement is provided for by complementary wedging configurations 40 and 41 of the disk rim 42 and the cup edge 43 respectively, this wedging interlock not only coupling the cup to the disk for rotative movement relative thereto but also producing a bias between the contacting surfaces thereof to produce a fluid tight seal.

Figure 7:
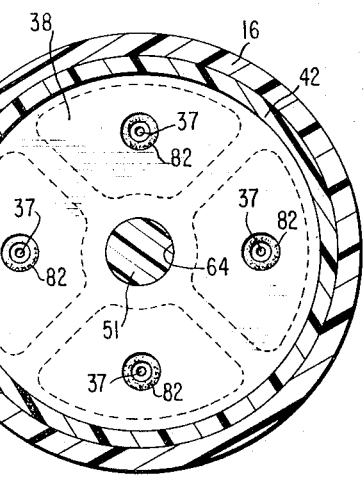
FIG. 7 is a view taken on line 7—7 of FIG. 1.

The cup has wall means 44 which define a plurality of discrete additive fluid compartments 45 and, as mentioned, each compartment has an additive opening 37 in its bottom wall 38 as seen in FIG. 7.

Figure 8:
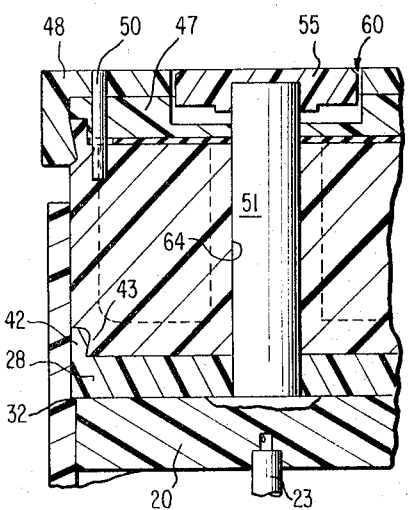
FIG. 8 is a view taken on line 8—8 of FIG. 6.

Preferably, the cup includes a top gasket 46 and a tight fitting cover 47. A selector ring 48 is locked to the cover and cup assembly by vertical pin 50 (FIGS. 6 and 8) to provide a clamped and rigid sealing engagement of the cover and to facilitate selection of the desired additive fluid compartment by rotation of the selector ring 48.

In the embodiment shown, the means for depressing the valve means 20 to open the container valve 23 is provided by a piston rod 51 which extends centrally upwardly through a first bearing 52 through the seal disk 28 and a second bearing 64 through the cup 39 and its cover 47, a button 55 being mounted at the top of rod 51. It will be noted in FIG. 1 that the top surface of this button 55 and of the selector ring 48 form a common plane and, as seen in FIG. 3, an arrow 56 is provided on button 55 for alignment of the selector ring 48 to indicate the compartment in discharge position. It will be understood that if an additive fluid opening is not rotated into discharge position, propellant fluid alone may be discharged.

Vent means 60 are provided to allow air to enter through a venting flow path to the selected compartment when in discharge position, this vent flow path being defined by clearance between the selector ring 48 and button 55, a radial slot 61 in the lower part of the button, a slot 62 on the outside upper portion of the rod 51 and a slot 63 for each compartment formed at the top of the second central bearing 64 (FIGS. 2, 4, 5 and 6).

The container spring bias closing the valve 23 may be relied upon to return the valve means 20 to its up closed position. However, added biasing means such as spring 70 may be added; this spring may be seated on the housing 15 or on the container 19 as shown with its upper portion seated against the valve means 20.

Figure 9:
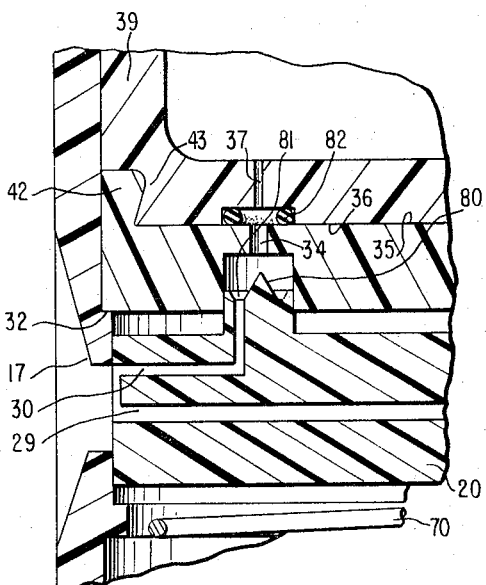
FIG. 9 is an enlarged vertical cross section view of a portion of the spray head in the discharge position of FIG. 2.

Preferably the pin 26 of the top seal means 25 is provided with a cone 80 (FIG. 9) aligned for entry into and sealing engagement with the lower end of the second additive duct 34 as seen in FIG. 9. Surrounding the cone 80 is an annular gutter or sump 81 formed in the top of the pin 26 around the cone 80 for collecting additive fluid flowing over the cone and directing it into the first additive duct 30.

A sealing O-ring 82 (FIG. 7) is provided at the lower end of each additive opening 37 in the cup 39. Also in the embodiment shown, a series of vertical vent slots, such as vent slot 83 shown in FIG. 2 are provided around the periphery of the valve means 20 to ease the vertical valve actuating movement.

While the invention has been described with reference to certain embodiments, they are to be considered illustrative rather than limiting, and it is intended to cover all further embodiments that fall within the spirit and scope of the appended claims.

I claim:

1. A spray head for containing a plurality of additive fluids and adapted for use with a propellant container of the aerosol bomb type having a discharge valve biased to a closed position for the propellant fluid, said spray head including a housing having a vertical sidewall with a spray aperture in its lower portion and attaching means for rigid attachment to said container, valve means mounted for vertical movement only in the lower portion of said housing at said spray aperture and having a bottom socket for snugly receiving said valve and having top seal means, said valve means having a propellant duct extending from said socket to said spray aperture and a first additive duct extending from said top seal means to said spray aperture, a seal disk mounted in a fixed position in said housing having a top surface and a bottom seal means vertically aligned for sealing engagement with said top seal means and having a second additive duct extending from said bottom seal means to said top surface, a cup mounted for non-vertical movement only in the upper portion of said housing and having wall means defining a plurality of discrete additive fluid compartments in said cup, each compartment having a bottom wall with an additive opening therethrough, said seal disk and said cup being mounted in said housing to enable movement of a selected additive opening to a discharge position with said second additive duct and to provide a fluid seal between the top surface of said seal disk and the bottom wall of the cup, and vent means providing a venting flow path to the selected compartment when in said discharge position.

2. A spray head as defined in claimed 1 and wherein said valve means includes a flat piston and wherein said top seal means includes an upstanding lock seal pin, the bottom seal means of said seal disk including a bottom pin socket which sealably houses said lock seal pin, and prevents rotation of said seal disk.

3. A spray head as defined in claim 2 and wherein said seal disk and said cup connected by a wedge interlocking of complementary parts and wherein this connection produces a fluid sealing bias therebetween, and wherein said cup is rotatably connected to said disk.

4. A spray head as defined in claim 3 and wherein said lock seal pin has a top cone and a gutter surrounding said cone for collecting additive fluid, said cone entering into and sealing said second additive duct.

5. A spray head for containing a plurality of additive fluids and adapted for use with a propellant container of the aerosol bomb type having a discharge valve biased to a closed position for the propellant fluid, said spray head including a cylindrical housing having a vertical sidewall with a spray aperture in its lower portion, a horizontal internal annular ledge, a vertical slot, and attaching means for rigid attachment to said container, valve means including a flat piston having a central upstanding rod mounted for reciprocating movement in the lower portion of said housing at said spray aperture and having a bottom valve socket for snugly receiving said valve, said valve means including top seal means having an upstanding lock seal pin, a lug extending into said vertical slot to restrict movement of said piston to vertical movement only, said valve means having a propellant duct extending from said socket to said spray aperture and an additive duct extending from said top seal means through said pin to said spray aperture, a seal disk supported on said ledge and having an upstanding outer annular rim and an internal flat top surface with a first central bearing for said rod and an offset second additive duct extending from said top surface to a bottom seal means which includes a bottom pin socket, said pin socket sealably housing said lock seal pin during reciprocating movement, a compartmented cup having a bottom surface with a second central bearing for said rod and a lower annular edge, the disk rim and cup edge having complementary wedging configurations to bias the cup bottom surface against the disk top surface to produce a rotatable fluid sealed connection, said cup having wall means defining a plurality of discrete additive fluid compartments in said cup, each compartment having a bottom wall with an additive opening therethrough which on rotation of said cup is selectively positionable in discharge position with said second additive duct, a bottom mounted on said rod for actuating the container valve and for locking the spray head together, and vent means providing a flow path under said button down said rod and into a selected chamber in discharge position.

References Cited by the Examiner

UNITED STATES PATENTS

| | | | |
|---|---|---|---|
| 1,953,330 | 4/1934 | Andres | 239—363 |
| 3,110,423 | 11/1963 | Hegedic et al. | 239—305 |
| 3,180,578 | 4/1965 | Hagadorn | 239—307 |
| 3,236,418 | 2/1966 | Dalle et al. | 222—394 |
| 3,240,396 | 3/1966 | Friedenberg | 222—394 |

M. HENSON WOOD, JR., *Primary Examiner.*

R. S. STROBEL, *Assistant Examiner.*